United States Patent
Walz et al.

(10) Patent No.: US 12,252,356 B2
(45) Date of Patent: Mar. 18, 2025

(54) METHOD AND SYSTEM OF PRODUCING COIL SPRINGS

(71) Applicant: WAFIOS Aktiengesellschaft, Reutlingen (DE)

(72) Inventors: Bernd Walz, Pfullingen (DE); Frank Weiblen, Metzingen (DE); Stefan Fries, Reutlingen (DE); Michael Sosnowski, Reutlingen (DE); Felix Meyer, Reutlingen (DE)

(73) Assignee: WAFIOS Aktiengesellschaft, Reutlingen (DE)

( * ) Notice: Subject to any disclaimer, the term of this patent is extended or adjusted under 35 U.S.C. 154(b) by 283 days.

(21) Appl. No.: 17/963,235

(22) Filed: Oct. 11, 2022

(65) Prior Publication Data

US 2023/0114519 A1 Apr. 13, 2023

(30) Foreign Application Priority Data

Oct. 13, 2021 (DE) .......................... 102021211526.8

(51) Int. Cl.
*B21F 3/02* (2006.01)
*B23Q 7/08* (2006.01)
*B65G 51/02* (2006.01)

(52) U.S. Cl.
CPC ............... *B65G 51/02* (2013.01); *B21F 3/02* (2013.01); *B23Q 7/08* (2013.01); *B65G 2201/0232* (2013.01)

(58) Field of Classification Search
CPC ... B23Q 7/08; B21F 3/02; B21F 35/00; B65G 51/02
See application file for complete search history.

(56) References Cited

U.S. PATENT DOCUMENTS 3,673,745 A 7/1972 Watanabe et al.
3,844,069 A * 10/1974 Shank ..................... B24B 7/167
451/269

FOREIGN PATENT DOCUMENTS

| DE | 2006611 A1 | 9/1970 | |
| DE | 24 17 685 A1 | 10/1975 | |
| DE | 2417685 A | * 10/1975 | ............. B24B 7/167 |
| DE | 2426327 A1 | 12/1975 | |
| DE | 33 36 709 A1 | 4/1984 | |
| DE | 10 2010 014 385 B4 | 12/2011 | |
| EP | 2 826 734 A1 | 1/2015 | |
| EP | 2 926 946 A1 | 10/2015 | |
| JP | S-59-1142 A | 1/1984 | |
| JP | 2002-079339 A | 3/2002 | |

OTHER PUBLICATIONS

Extended European Search Report dated Mar. 23, 2023, of counterpart European Patent Application No. 22200048.1, along with an English machine translation.

* cited by examiner

*Primary Examiner* — Debra M Sullivan
(74) *Attorney, Agent, or Firm* — DLA Piper LLP (US)

(57) ABSTRACT

A collision-proof spring transfer takes place in the process, which comprises a continuous transfer of coil springs from the pipeline through an exit opening of the pipeline into assigned spring receptacles, and an automatic prevention of any re-entry of coil springs that have passed through the exit opening in the direction of the spring receptacle and rebound from the region of the spring receptacle back into the pipeline.

20 Claims, 5 Drawing Sheets

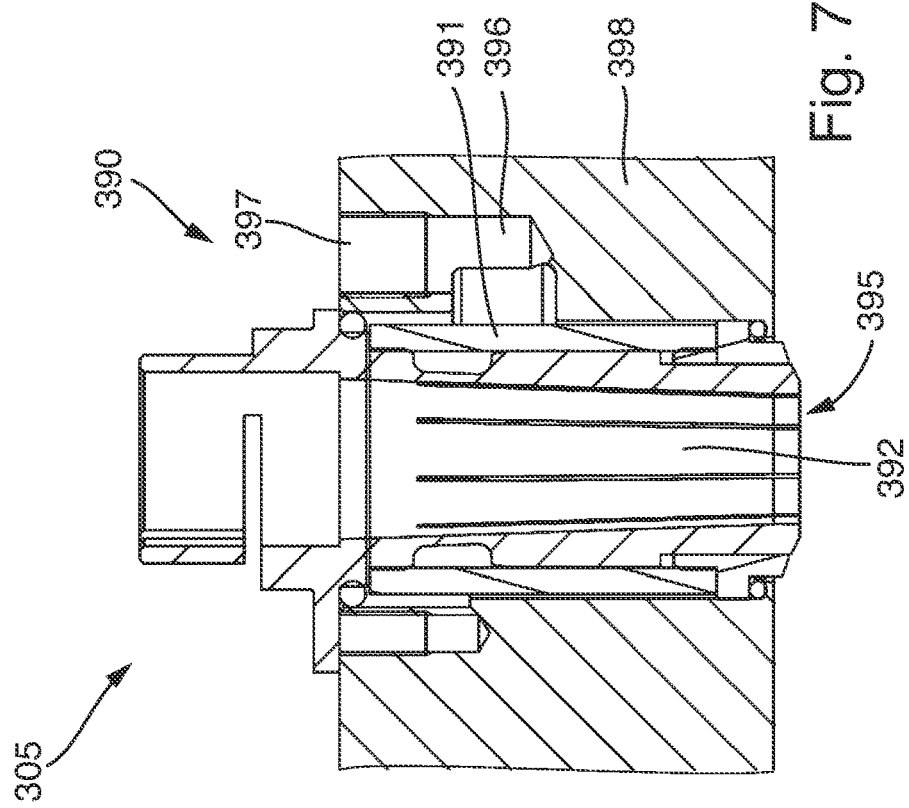
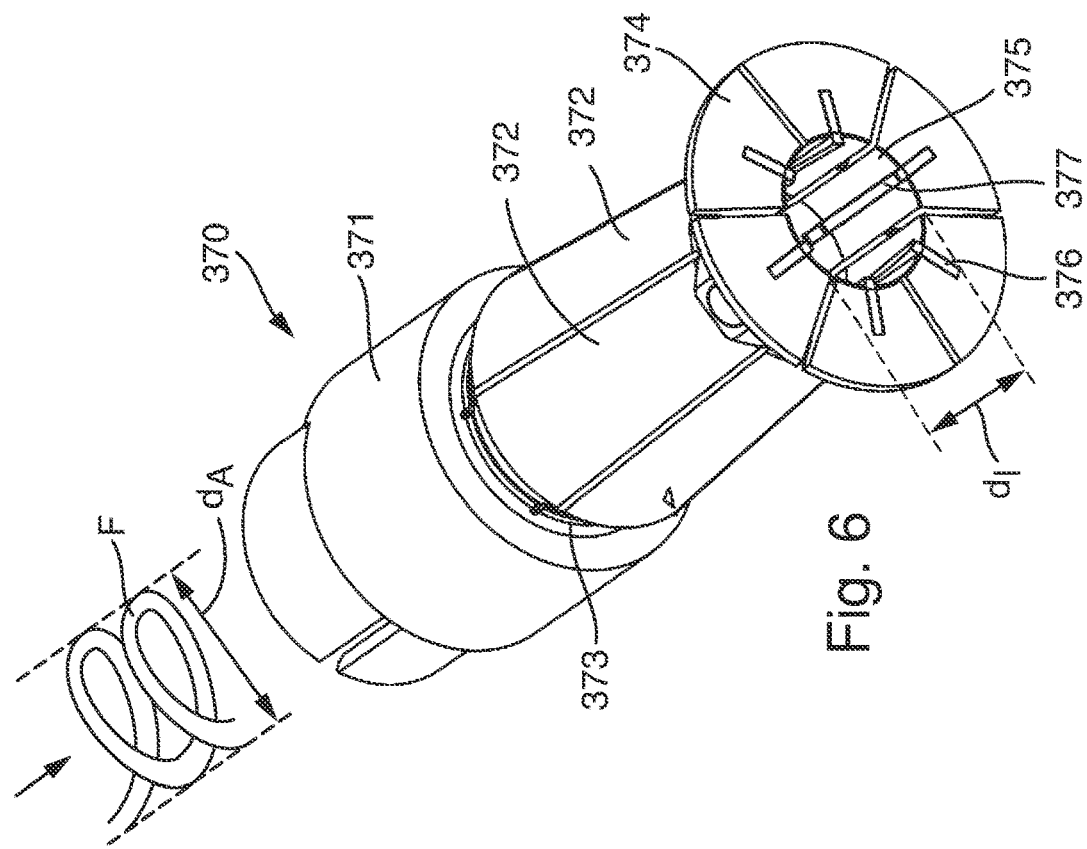

METHOD AND SYSTEM OF PRODUCING COIL SPRINGS

TECHNICAL FIELD

This disclosure relates to a method and a system of producing coil springs.

BACKGROUND

Coil springs are machine elements that are required in large numbers and different design examples in numerous fields of application. Coil springs, which are also referred to as wound torsion springs, are usually produced from spring wire and, depending on the load which is present during use, are conceived as tension springs or compression springs.

Nowadays, coil springs are usually manufactured by spring coiling with the aid of numerically controlled spring coiling machines. A wire (spring wire), while controlled by an NC control program, is supplied to a forming installation of the spring coiling machine and with the aid of tools of the forming installation, for example, winding pins and one or a plurality of pitch tools, formed to a coil spring. Upon completion of a forming operation, the completed coil spring, while controlled by the NC control program, is severed from the supplied wire by a cutting system.

Further machining steps and/or checking steps typically follow to obtain from the completely wound coil spring, which has been severed from the wire, a coil spring which is ready for use and has the desired mechanical and geometric properties. Therefore, spring coiling machines are often integrated in a more complex system (manufacturing system) which in addition to (at least) one spring coiling machine comprises at least one downstream machine and a transport system for transporting the coil springs from the spring coiling machine to the downstream machine. A downstream machine can have, for example, a heat treatment unit and/or a checking station for checking geometric properties of the coil spring (for example, the spring length). In coil springs, which for their application require ground ends, a spring end-grinding machine can also follow as a downstream machine.

The first and unexamined publication DE 24 17 685 A1 describes a device for transporting successively supplied coil springs from a spring coiling machine to a working machine, in particular a spring end-grinding machine. The device has a pneumatic conveyor installation which comprises a suction installation, which is disposed at the beginning of the conveying section, adjoining thereto a device for conveying the coil springs in the axial direction in the compressed air flow, adjoining thereto a pipeline, and a singularization installation which is disposed at the end of the pipeline ahead of the workpiece receptacle of the working machine and is controlled by the latter. The pipeline of the example terminates in a duct which is disposed to be coaxial with a coil spring receptacle of the downstream working machine and has two fingers that are spaced apart behind one another in the axial direction of the pipe, the mutual spacing of the fingers corresponding approximately to the length of a coil spring, and the fingers being disposed to alternatingly engage in the duct. It can be ensured in this way that only a single coil spring is supplied to each workpiece receptacle.

There is continuing demand to further increase the cycle times of manufacturing systems to increase productivity.

It could therefore be helpful to provide a method and a system of producing coil springs, the method and system compared to conventional methods and systems enabling a trouble-free long-term operation with a particularly high output rate.

In the method and the system of producing coil springs from wire, a wire as the initial material is conveyed from an "endless" wire reserve to a numerically controlled spring coiling machine by a supply installation. Portions of the wire in the spring coiling machine are successively supplied to a forming installation by an infeed installation, and in the forming installation each formed to coil springs in a forming operation. The forming installation has forming tools, for example, winding pins and optionally one or a plurality of pitch tools. After the forming operation, each coil spring is severed from the supplied wire with the aid of a cutting installation. Thereafter, the severed coil springs are successively, thus one piece after another, transported through a pipeline of a pneumatic conveyor system into a spring receptacle of a downstream machine.

The downstream machine has at least one spring receptacle for receiving a single coil spring. The pneumatic conveyor system, behind an inlet opening of the pipeline, has a feeding installation for pressurized fluid which serves to accelerate the coil springs in the transport direction within the pipeline. An exit opening for dispensing coil springs into the respectively assigned spring receptacles is disposed on an exit side of the pipeline.

The conveying fluid, which is introduced under pressure, typically compressed air, singularizes the coil springs that are successively introduced through the introduction opening, on the one hand, and transports the coil springs through the pipeline, on the other hand. Directly successive coil springs typically have a mutual spacing, thus are transported in a singularized form. This transport should take place as fast as possible. Transportation at a high transport speed is to be envisaged when particularly high piece rates and correspondingly high cycle rates are envisaged.

We established that during the transfer of the coil springs from the pipeline to the spring receptacles of the downstream machine, depending on the conveying speed and the spring type, coil springs impact the base region of a spring receptacle and can then rebound in the direction of the pipeline. This rebounding action, which results by virtue of a reversal of direction in the event of kinetic energy being converted into tension energy and back to kinetic energy in a pulse-like manner, can only be controlled with difficulty and may lead to collisions and disruptions in the process sequence caused as a result.

To avoid such problems, the pipeline can be extended so far that the kinetic energy is gradually dissipated as a result of friction on the walls of the pipeline on the long transport path. Alternatively or additionally, portions of the pipe can be configured with an incline to achieve a reduction in the transport speed while utilizing gravity. However, these measures have proven to be useful only to a limited extent.

A practically trouble-free operation even at high piece rates and high transport speeds in the pipeline can be achieved in that a coalition-proof spring transfer is provided, which comprises a continuous transfer of coil springs from the pipeline through an exit opening of the pipeline into assigned spring receptacles, and an automatic prevention of any re-entry of coil springs that have passed through the exit opening in the direction of the spring receptacle and rebound from the region of the spring receptacle back into the pipeline.

Accordingly, our system comprises a collision-proof spring transfer system which as a result of the constructive and functional features thereof is configured for a continuous transfer of coil springs from the pipeline through an exit opening of the pipeline into assigned spring receptacles, and automatically preventing any re-entry of coil springs that have passed through the exit opening in the direction of the spring receptacle and rebound from the region of the spring receptacle back into the pipeline.

"Continuous transfer" describes inter alia that the coil springs on the way through the pipeline to the exit opening and thereafter to the spring receptacle are not stopped to be stationary at any location. Directly successive coil springs ideally do not touch one another during the entire transport; a sufficient spacing is rather maintained. In this way, no collisions arise in the forward movement. In a rebounding spring, a collision with a following spring is avoided or prevented, respectively, by the active, automatic prevention of the re-entry.

There are various approaches towards achieving the collision-free spring transfer. The approaches can be utilized individually as well as in combination.

The successively transported coil springs that arrive in the end region of the pipeline, in the region of a brake installation disposed on the end of the pipeline, may be decelerated over a braking track from an entry speed when entering the braking track to a finite exit speed, reduced compared to the entry speed, when exiting the braking track such that the coil springs are dispensed continuously, i.e., without being stopped or brought to a standstill, and without mutual contact and in the cycle of entry, at the exit speed through an exit opening in the direction of the spring receptacle. "In the cycle of entry" means in particular that the substantially same braking effect, or decelerating effect, is to be exerted on each coil spring.

Unavoidable frictional effects, which are however difficult to control, along a potentially very long transport section within the pipeline are thus not relied on, but a decisive brake installation having a braking effect which is able to be defined is provided at the end of the pipeline. The coil springs here are not brought to a standstill or stopped, respectively, but remain in a controlled movement and then exit in the cycle of the production thereof at a finite but not excessive exit speed from the pipeline and into the associated spring receptacle, without rebounding of the coil springs to a disruptive extent being able to arise. The braking track preferably has a length which is only a fraction of the length of the entire conveying section between the entry opening and the exit opening, for example, is less than 10% or less than 5% of the latter length, for example, between 0.5% and 5% of the length of the entire conveying section.

When the braking effect is properly adjusted, such a brake installation prevents the problems caused by rebounding coil springs in that so much kinetic energy is removed from the coil springs as a result of the braking procedure that rebounding is avoided or the extent of the latter is reduced so much that the springs cannot rebound back to the exit opening. The brake installation thus addresses the root of the problem, specifically at the potentially excessive kinetic energy when exiting the pipeline. If this energy is sufficiently reduced, it can be typically avoided that springs rebound excessively far, despite being delivered at an excessive speed.

One example provides automatic blocking of the pipeline in relation to any re-entry of a coil spring rebounding in the region of the spring receptacle upon passing through the exit opening, or a complementary blocking installation, respectively. In this way, collisions between following incoming coil springs and rebounding coil springs can be reliably prevented. The blocking is preferably achieved by a temporary variation of the diameter of the exit opening to a diameter which is smaller than the maximum diameter of the coil spring.

The maximum diameter of a coil spring in a cylindrical coil spring corresponds to the external diameter of the latter, the external diameter nominally being constant across the entire spring length. In coil springs having a diameter which varies across the length, for example, in barrel-shaped or conical coil springs, the maximum diameter corresponds to the external diameter at the thickest location.

The automatic blocking can be provided alternatively or additionally to braking by the brake installation. When combined with the brake installation, the process reliability can be further increased and it can be reliably ensured that coil springs cannot make their way back into the pipeline by virtue of rebounding.

Automatic blocking of the pipeline, or a blocking installation configured to this end, respectively, can if required also prevent the re-entry individually, thus without a brake installation.

An example provides that the exit opening of the spring transfer system, or of the pipeline, respectively, is configured as a variable-diameter exit opening which permits a temporary, preferably stepless and completely reversible, variation of the diameter of the exit opening between a first diameter and a second diameter, wherein the first diameter is smaller than the maximum diameter of the coil spring, and the second diameter permits the coil spring to pass through the exit opening. A temporary enlargement of the diameter as a passage dimension (second diameter) permits the spring to pass through. When reduced to undersize (first diameter), the exit opening acts as a blocking installation such that no coil spring fits through the exit opening.

Various examples have a dedicated blocking installation having at least one locking element which in response to control signals and with the aid of a drive is able to be transferred automatically from a retracted neutral position, or neutral configuration, to a blocking position, or blocking configuration to block the return path. The locking element can be movably mounted, for example, and be driven by an electrically actuatable lifting magnet, optionally also be driven pneumatically or with the aid of a drive motor. This can also be a variable-diameter locking element.

The brake installation may have an automatically closing supply nozzle which has a nozzle body with a variable-diameter portion that has an internal diameter which in a load-free basic state is smaller than the external diameter of the conveyed coil springs and by way of a coil spring passing through is able to be elastically expanded to a passage cross section, wherein the variable-diameter portion preferably forms the exit opening. The automatically closing supply nozzle here fulfils a double function. A braking effect which is adjustable in a targeted manner is achieved, on the one hand, because the coil springs passing through have to squeeze through the variable-diameter portion, the latter under elastic forces being pressed against the windings of the coil spring passing through. This results in a readily controllable braking effect. Moreover, the supply nozzle acts in a manner similar to that of a check valve because, once a coil spring has passed through, the passage cross section is too small to permit a coil spring that potentially rebounds from the spring receptacle back in. A nozzle at the end of the transport path is thus utilized here for decelerating the coil spring, the nozzle closing the return path of the coil spring once the latter has passed the supply nozzle. The supply nozzle thus also functions as a blocking installation for automatically blocking the pipeline in relation to any re-entry of a coil spring that, after passing through the exit opening, rebounds from the region of the spring receptacle.

The supply nozzle may have an entry-proximal sleeve-shaped base portion and, adjoining thereto, an annular assembly having a plurality of fingers which by way of spring-elastic integral hinge portions are connected to the base portion in a radially pivotable manner, wherein free ends of the fingers enclose the exit opening. The base portion can be configured in the manner of a sleeve that is closed in the circumferential direction. The sleeve wall towards the exit side is subdivided into a multiplicity of elastic, pivotable fingers by a plurality of longitudinal slots that are continuous in the radial direction. The supply nozzle can have, for example, three, four, five, six, seven or eight fingers which are preferably of mutually identical design.

The spring-elastic integral hinge portions have proven to be extremely suitable to obtain an ideally stable base portion, on the one hand, and adjust the spring characteristics of the elastic finger such that a coil spring passing through is able to outwardly expand the fingers but contact pressure forces that are suitable for deceleration nevertheless remain, on the other hand. The elastic forces which arise in the region of the exit nozzle and act in the radial direction can be very precisely adapted to the respective situation of the application by a suitable basic concept of the length, thickness and geometric design of the integral hinge portions. The supply nozzle can be an integral component in the manner of a sleeve which is slotted on one side.

The supply nozzle may be made of plastics material, specifically in particular by a 3D-printing method. Individual adaptations to the respective spring geometry and conveying output can be achieved in a rapid and precise manner as a result.

To achieve that the free ends that come into contact with the coil springs passing through can permanently fulfil their task, on the other hand, anti-wear inserts from a wear-resistant material, for example, from hardened steel, are inserted at the free ends of the fingers in preferred examples. The anti-wear inserts can form axially parallel guide strips which by way of the radially inner guide faces thereof the limit the exit opening and come into contact with the windings of the coil spring.

In many examples, it has proven to be expedient for the coil springs to be decelerated in a plurality of braking stages, in particular in two successive braking stages with different braking effects. As a result, the overall braking performance can be even better adapted to the respective operating conditions and spring types.

In many examples, a braking stage comprises frictional braking in a guide duct adapted in terms of diameter, and a subsequent braking stage comprises squeezing through an elastically expandable exit opening with a diameter deficit. While being in the upstream frictional braking stage in a cylindrical guide duct with an adapted diameter, the coil spring can be stabilized in terms of the orientation of the latter and partially braked. The partially braked coil spring is then intensely braked when being squeezed through the expandable exit opening in a second stage.

To this end, the brake installation can have a spring-specifically adapted spring guide sleeve having a cylindrical guide duct which has an internal diameter that is adapted to the external diameter of the coil spring such that the coil springs fit through the guide duct substantially without any clearance. The cylindrical guide portion can have a length which corresponds to a multiple of the internal diameter, for example, corresponds to at least five times the latter, preferably a length which is in the range between five times and 10 times the internal diameter. This internal diameter can be smaller than the internal diameter of an upstream pipeline main portion of the pipeline that bridges the largest part of the transport path between the spring coiling machine and the downstream machine. This pipeline main portion can be implemented, for example, with the aid of a plastic hose, for example, from PTFE, while the spring guide sleeve can be expediently made from a metallic material, for example, from steel.

The spring guide sleeve, on an entry side of the guide duct, can have an introduction portion which conically widens toward the entry side and preferably transitions to a cylindrical attachment portion of which the internal diameter corresponds substantially to the external diameter of an upstream portion of the pipeline, for example, the exit-proximal end of the pipeline main piece. The spring-specifically adapted spring guide sleeve can be configured as an easily interchangeable replacement part, to adapt the pneumatic conveying installation in a rapid and uncomplicated manner to different spring diameters within the scope of the diameter range that can be utilized by the pipeline main piece.

The spring guide sleeve is preferably disposed between a pipeline main piece and the automatically closing supply nozzle such that, with the aid of the spring guide sleeve, the first braking stage of a multi-stage braking process can be implemented, the second stage of the latter being performed in the region of the automatically closing supply nozzle.

As a further safety installation in the context of decelerating incoming coil springs, the brake installation may have at least one magnet configured to decelerate by magnetic forces a coil spring introduced into the spring receptacle, and hold the coil spring in the spring receptacle. The magnet can be a permanent magnet or an electromagnet which can be electrically excited if required. Two or more magnets, which in the longitudinal direction of the spring receptacle preferably lie on top of one another such that a sufficient, magnetically effective section can be built up in a flexible manner, can be provided instead of a single magnet.

The magnetic brake installation is preferably disposed at a loading position of the downstream machine, thus acting only on that spring receptacle that is currently to be loaded or filled, respectively.

Such additional installations having magnets are effective above all for coil springs which are composed of a magnetizable wire material, for example, from a magnetizable spring steel. We established that a magnetic braking effect can also be achieved in nominally non-magnetic steel materials, for example, in certain non-corroding steel types that are considered non-magnetic. Materials of this type can however be imparted a magnetizing capability which is induced by forming, by virtue of the high degrees of forming during the spring coiling process such that the materials can be effectively decelerated with the aid of magnets of the brake installation and be held in the spring receptacle.

Various downstream machines for the further machining and/or further treatment of finished coil springs can be connected to a spring coiling machine with the aid of the pneumatic conveyor system. Preferably, the downstream machine has a plurality of workstations and an internal transport unit for transporting coil springs along a transport path to the workstations, wherein the transport unit by a rotary drive is rotatable about a preferably vertical rotation axis and has a plurality of spring receptacles which in the form of a ring are disposed about the rotation axis and are configured to receive in each example a single coil spring. One of the workstations is a loading station, and the pipeline leads to the loading station such that an end portion of the pipeline that contains the exit opening is disposed to be coaxial with a spring receptacle positioned in the loading position. In this way, a direct transfer of an incoming coil spring through the exit opening into the spring receptacle ready for receiving the spring is possible.

It may be necessary for the finished coil springs after the spring coiling to be subjected to a heat treatment, for example, to reduce the internal bending stress introduced by the spring coiling and to raise the yield strength again, and/or to eliminate again any undesirable magnetization induced by forming. Therefore, the downstream machine preferably has a heat treatment unit comprising a heating station disposed downstream of the loading station, and preferably also a cooling station disposed downstream of the heating station. Proceeding from the loading station, a coil spring can first be transported to the heating station, therein be heated or annealed, for example, by induction or conduction of an electric current, according to a heating profile, and thereafter by further cycling of the internal transport unit be transported into the region of the cooling station to cool the spring to a lower temperature that is suitable for further processing. The cooling station can have a single cooling unit. The cooling station preferably comprises two or more cooling units which are disposed successively in the transport direction to have overall sufficient time for cooling, and to optionally be able to cool in a plurality of stages and/or according to a comparatively complex cooling profile.

Additionally, one or a plurality of further workstations can be provided along the transport path, for example, a setting station, a measuring station, an ejection station for bad parts, and injection station to a quality control unit, an ejection station for good parts, and/or an empty checking station. The measuring station can be configured, for example, as a length measuring station and/or as a diameter measuring station to detect the relevant final dimensions of a coil spring after the heat treatment and optionally after the setting operation. If the measuring values are outside the specified range, the coil springs are considered to be bad parts and ejected at the ejection station for bad parts, for example, into a collection container. The parts that are not ejected in this instance are good parts. Some of the latter can be ejected at the ejection station to a quality control unit for sporadic detailed quality control procedures, for example. The coil springs that in this instance still remain in their spring receptacles are good parts which at their corresponding ejection station are supplied to a downstream machine or any other workstation, preferably again through a pipeline of a pneumatic conveyor system.

An important contribution towards a trouble-free operation of the manufacturing system may be provided in that an operating control system having a multiplicity of sensors for monitoring the production and for feedback-controlling production parameters as a function of sensor signals is provided.

The operating control system may be configured to carry out feedback-controlling of the entry speed to a value within a specified range. This can be achieved by detecting an actual speed of the coil springs in the region of a measuring section which, having a suitable length, lies between the spring coiling machine and the brake installation; comparing the actual speed to a target speed to determine a speed variance, and optionally varying a conveying output as a function of the speed variance. It can be achieved in this way that the brake installation can always operate in the optimal entry speed range for which the brake installation is conceived in terms of construction.

The operating control system may comprise one or a plurality of the functional groups explained hereunder.

A functional group which has two spring passage sensors disposed to be mutually spaced apart at different positions of the pipeline, wherein sensor signals of the spring passage sensors are processed to detect a time-of-flight in the pipeline. As a result, the operating control system can be configured to detect a time-of-flight. The latter can be utilized, for example, to trigger an automatic shutdown should springs be transported excessively fast or excessively slow such that this would indicate a malfunction.

Alternatively or additionally provided is a functional group having two spring passage sensors disposed to be mutually spaced apart at different positions of the pipeline, wherein sensor signals of the spring passage sensors are processed to determine the entry speed of the coil springs into the braking track. The conveying output of the conveyor system is then preferably feedback-controlled as a function of the determined entry speed, specifically such that the entry speed is substantially constant and remains within a target range for the entry speed for which the brake installation is conceived. Should it thus emerge, for example, that the coil springs are increasingly conveyed too slowly through the pipeline by virtue of contaminations or the like, which manifests itself in extended times-of-flight and/or decreasing entry speeds, it could be possible that the brake installation no longer reliably permits the coil compression springs that enter at an excessively slow speed to pass. The entry speed can be substantially adjusted to the target value thereof by increasing the conveyed volume of the conveying fluid. Provided to this end is a proportional valve that may be directly actuatable by sensor signals and which can implement this feedback-control of the conveying output with very short response times, while bypassing the longer control path via the control unit of the system.

The one and the same pair of sensors can be utilized to detect the time-of-flight and determining the entry speed. In most instances, different pairs of sensors are utilized for these different purposes. One sensor can be assigned to more than one functional group.

A functional group can have an exit sensor to detect a coil spring exiting the exit opening. It is thus known to the operating control system at any time when a coil spring exits the conveyor system in the direction of the spring receptacle, and how many springs exit in absolute terms and per unit of time.

In examples in which the downstream machine has a plurality of workstations and an internal transport unit having a multiplicity of spring receptacles for transporting coil springs to the workstations, controlling the transport unit can be provided as a function of the delivery of coil springs. For example, the internal transport unit of the downstream machine can be controlled as a function of sensor signals of the exit sensor such that the internal transport unit is stopped when an exiting coil spring is detected. As a result, undesirable collision situations, which could lead to the deformation of coil springs and/or to damage to the installations of the machine, can be avoided.

The operating control system can furthermore contain a good parts sensor to detect the number of ejected good parts, a bad parts sensor to detect the number of ejected bad parts, a quality control sensor to detect the number of coil springs ejected for quality control, and/or an empty checking sensor to detect the number of coil springs that are ejected at an empty checking station.

With the aid of the signals of these sensors it is possible to carry out monitoring of 100% of the parts count, wherein each of the manufactured coil springs can be assigned to one of the corresponding further processing categories at any time. In this way, checking the whereabouts of 100% of the coil springs is also possible once manufacturing has been completed.

BRIEF DESCRIPTION OF THE DRAWINGS

FIG. 6 shows an example of an automatically closing supply nozzle.

FIG. 7 shows an example of a switchable supply nozzle.

Further advantages and aspects of our systems and methods are derived from the description of examples explained hereunder by the figures.

DETAILED DESCRIPTION

Figure 1:
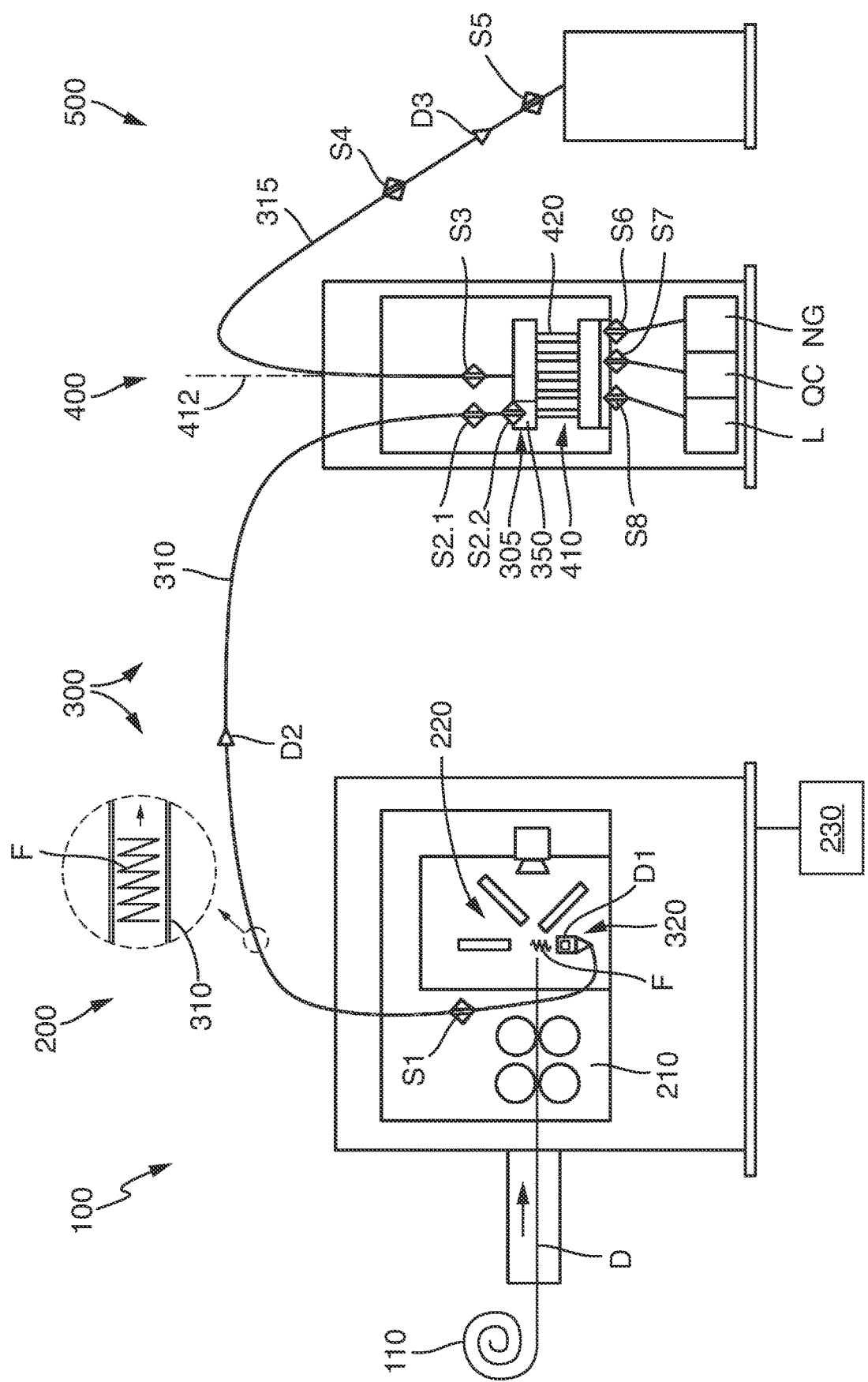
FIG. 1 shows a schematic general illustration of an example of a manufacturing system which to produce coil springs from wire is equipped with a spring coiling machine and a downstream machine.
Figure 2:
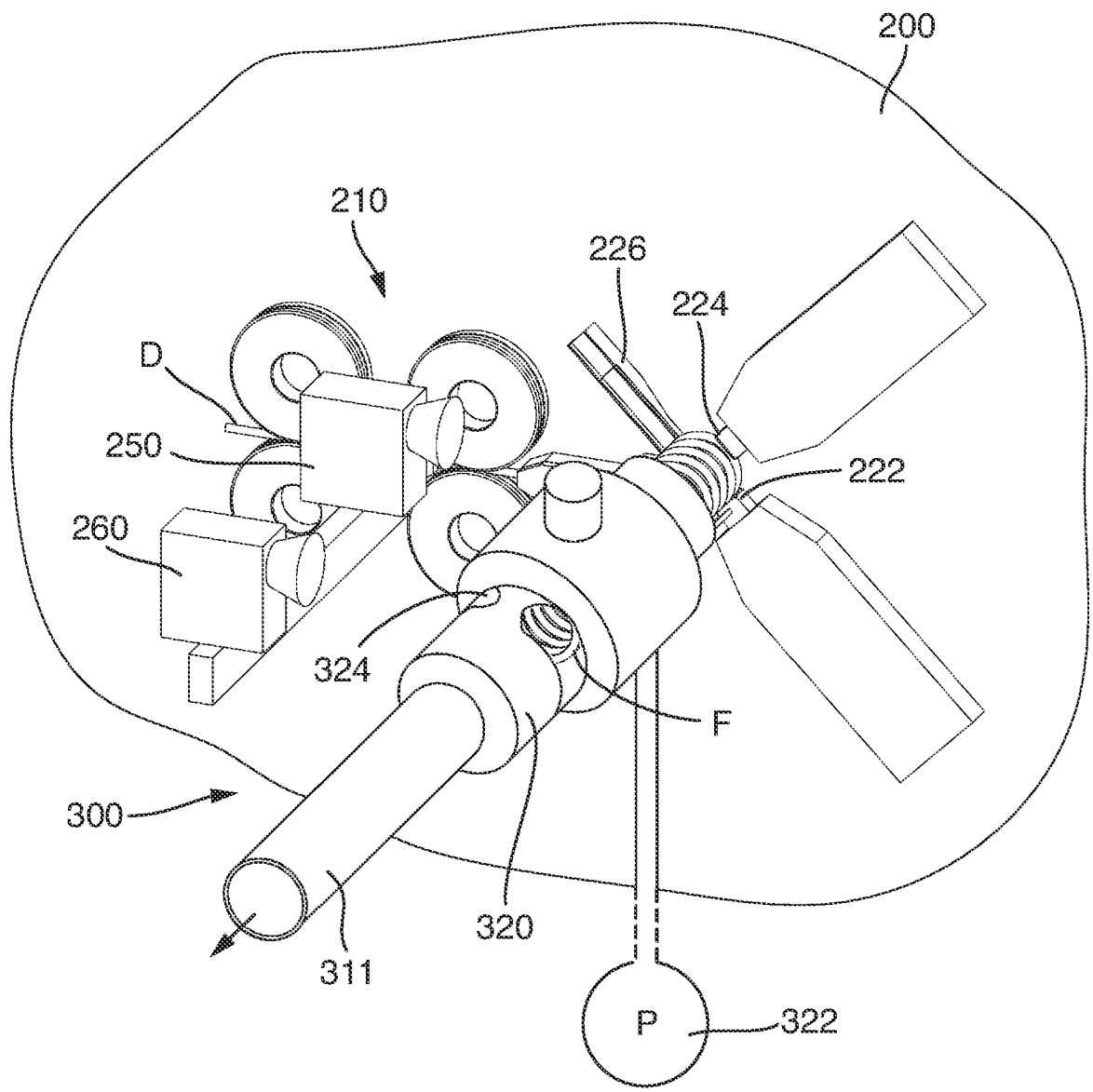
FIG. 2 shows a detail of the spring coiling machine having a camera-based measuring system that monitors the spring production, and a suction installation that suctions the coil springs into a pipeline of a pneumatic conveyor system.

The schematic general illustration in FIG. 1 shows an example of a manufacturing system 100 of producing coil springs from wire. The coil springs are also referred to as "springs," and the manufacturing system is referred to as "system." FIG. 2 shows details of the spring coiling machine of the system, having components of a camera-based measuring system, and of the pneumatic conveyor system.

An automatic spring manufacturing machine in the form of a CNC spring coiling machine 200 is part of the system. The CNC spring coiling machine 200 has an infeed installation 210 equipped with infeed rollers and feeds successive portions of a wire D by way of a numerically controlled advancing speed profile in the horizontal direction into the region of a forming installation 220. To this end, the wire, coming from a wire reserve (coil) 110 kept ready on a reel, is drawn and guided through a straightening unit (not shown). The wire D, with the aid of numerically controlled tools of the forming installation 220, in a spring coiling operation is formed to a coil spring F. The forming tools include two numerically controlled winding pins 222, 224, which are disposed to be offset at an angle of 90° and are aligned to be radial to the desired spring axis, and at least one pitch tool 226 to at any time predefine the local pitch of the developing spring in a numerically controlled manner (see FIG. 2). Furthermore provided is a cutting installation which after the completion of a forming operation severs a finished coil spring F from the supplied wire by way of a linear operating movement. The machine axes of the CNC machine associated with the movable components are controlled by a computer-numerical control installation 230.

The spring coiling machine 200 is equipped with a camera-based optical measuring system for the real-time, contactless detection of data pertaining to the geometry of a currently produced spring. Part of the measuring system is a CCD video camera 250 which is installed such that the field of vision thereof can detect a portion of the developing spring close to the tools of the forming installation, as well as a further video camera 260 by way of which the spring length can be determined. Data pertaining to the spring geometry of the produced spring can be determined from the camera images by image detection, the data in a computer of the control installation 230 being compared with corresponding data pertaining to a desired target geometry. As a result, it is possible for the spring coiling process to be monitored while a spring is being created, and optionally by way of feedback of measured values to feedback-control the spring coiling process by changing the actuated values of tools (in-process feedback-control). Moreover, it is possible to identify almost simultaneously with the production of the spring whether the produced spring is a good part (spring geometry in the tolerance range) or a bad part (spring geometry outside the tolerance range) which is to be removed. The optical measuring system functions as a component part of a quality detection system.

The coil spring F can be a coil compression spring or a coil tension spring, each having a cylindrical design or a design deviating from the cylindrical. In cylindrical coil springs, the spring diameter is constant across the length of the springs but can however also vary across the length such as in conical or barrel-shaped coil springs, for example. The overall length of the (unstressed) spring can also vary greatly for different applications.

The spring coiling machine can be constructed and operate as described in DE 10 2010 014 385 B4. Other design examples are also possible.

After being severed from the wire, the severed coil springs F with the aid of a pneumatic conveyor system 300 are successively conveyed automatically, in the cycle of the spring coiling machine by a compressed air flow, to a downstream machine 400 which is or can be at a distance of several meters from the spring coiling machine.

FIG. 2 shows the entry end of the conveyor system that faces the spring coiling machine, having a spring suction installation 320 connected to a compressed air source 322 and in the cycle of the machine suctions the completed coil springs into the pipeline 310 of the conveyor system 300. The machine-distal measuring camera 260 can detect the front end of the coil spring through a window 312 in the wall of the spring suction installation 320 (cf. FIG. 2) without interference.

The downstream machine 400 (exactly like the conveyor system 300) is a component part of the complete system 100 and is configured for carrying out downstream operations on the supplied coil springs. The downstream machine comprises a heat treatment unit for a controlled heat treatment of the freshly wound springs. Installations for quality control of the heat-treated springs and for sorting and relaying the latter to at least one downstream plant 500 are integrated.

The downstream machine 400 comprises an internal transport unit 410 which by a rotary drive is rotatable about a vertical rotation axis 412. The transport unit 410 has a multiplicity of vertically aligned spring receptacles 420 which are disposed to be outside the axis of the rotation axis of the transport unit 410 and are intended to in each configuration receive a single coil spring F for machining. The spring receptacles are disposed in the form of a ring about the rotation axis 412.

The spring receptacles 420 are formed substantially by cylindrical sleeves from an electrically non-conducting, torsion-resistant and temperature-resistant material. The upper and the lower ends of the vertically aligned spring receptacles are fastened in an upper ring 422 and a lower ring 424, respectively, the rings 422, 424 being connected to one another in a rotationally fixed manner and supporting the spring receptacles (cf. FIG. 5). The overall construction of the rotatable components here is also referred to as the loading plate 410. A support ring 426 which does not rotate and is made from a wear-resistant material is assembled below the loading plate, the wear-resistant flat horizontal upper side 428 of support ring 426 being disposed at a minor spacing below the spring receptacles. The received springs are supported on this upper side.

Figure 3:
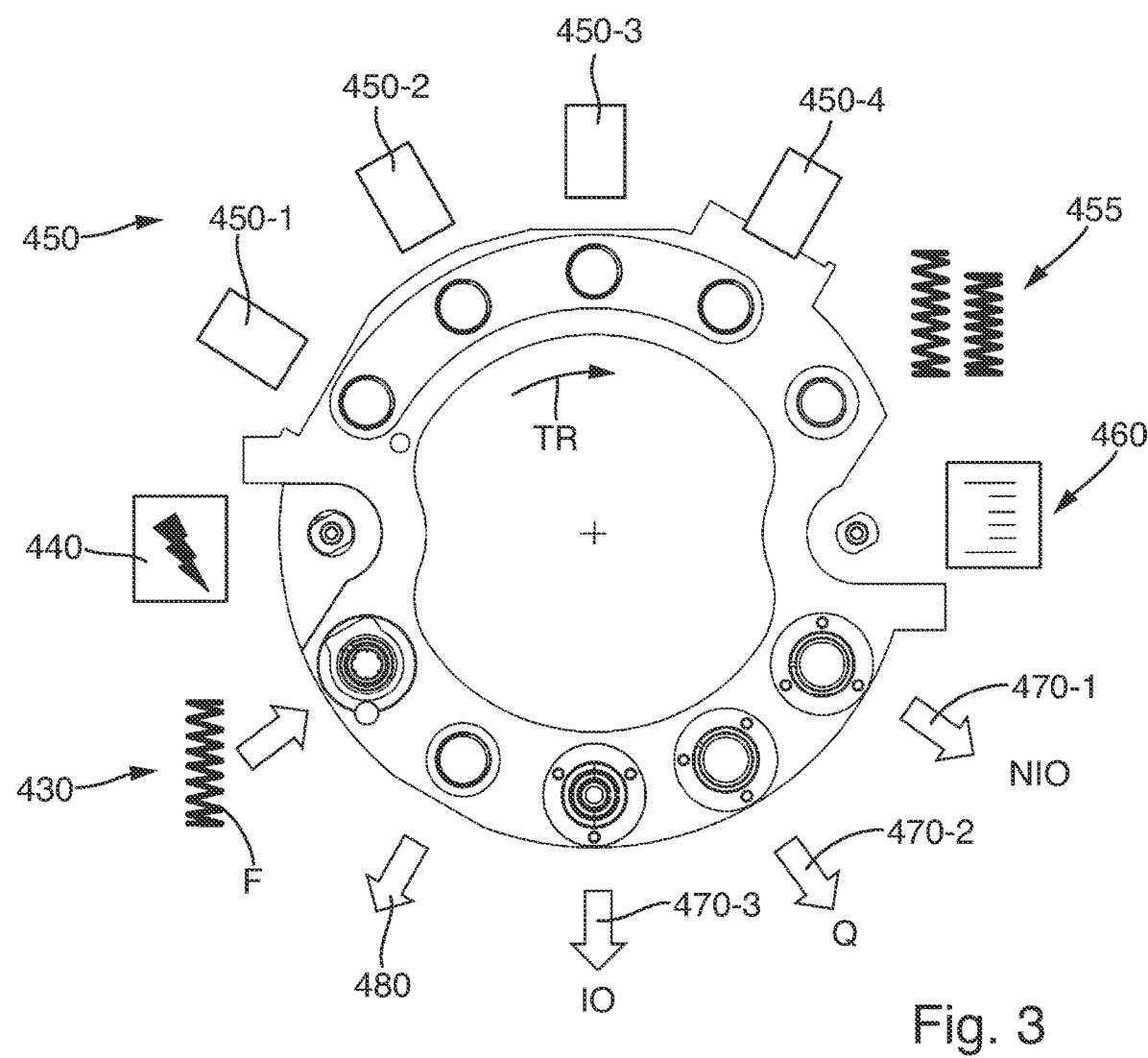
FIG. 3 shows a plan view from above onto the operating space of a downstream machine having a loading station, which is served by the pipeline, a heat treatment unit having a heating station and a cooling station, and further workstations.

A plurality of workstations of the downstream machine 400 are disposed about the external circumference of the transport unit 410, the plurality of workstations during the operation of the downstream machine being successively approached by a coil spring disposed in a spring receptacle 430 in that the transport unit is rotated. The plan view from above in FIG. 3 shows a preferred configuration. A spring receptacle is loaded with a single coil spring from vertically above at a loading station 430. The installations of the pneumatic conveyor system 300 provided to this end will yet be explained in more detail at a later stage (cf. FIG. 5, for example).

A heating station 440 in which the heating of the coil spring is carried out by induction, for example, or by conduction of a heating current, is situated to be disposed downstream of the transport unit in the transport direction TR. Following thereafter are, for example, four cooling units 450-1, 450-2, 450-23, 450-4 of a multi-stage cooling station 450, which are connected to a cold air blower and with the aid of cooled air cool the coil springs, which initially are still heated to several 100° C., in steps to at least a lukewarm temperature (40° C. or less). Internal stress in the spring wire, resulting from the forming operation, for example, is dissipated by the heat treatment, and any potentially generated magnetization is removed.

Following therefrom in the transport direction is a setting station 455 in which a setting operation can be carried out. The latter is typically used in the manufacture of coil compression springs for the following reason. Should the shear stress exceed the permissible value when the spring is loaded, a lasting deformation arises which manifests itself in the reduction of the unstressed length. In the field of spring technology, this procedure is referred to as "setting," this being associated with the characteristics of "creeping" and "relaxation" known from field of materials engineering. To counteract this setting procedure, the compression springs are wound to be longer by the expected setting value and subsequently compressed to the block length in a setting operation. This pre-setting enables a better material capacity and a higher load.

Following therefrom in the transport direction is a measuring station 460 which in the exemplary configuration is conceived as a length measuring station to measure the spring length present between the axial ends of the coil spring after the completion of the heat treatment and optionally of the setting operation. Alternatively or additionally, diameter values can also be measured, for example. The measured values are compared with corresponding target values to establish whether the spring is a good part (IO, in order), which is within the production tolerances, or a bad part (NIO, not in order), the characteristics of the latter not corresponding to the specification.

Following in the circumferential direction are a plurality of ejection stations at which a spring is ejected from the downstream machine as a function of the characteristics established on the spring. The bad parts (NIO) are removed from the spring receptacle at the ejection station 470-1 and ejected into a collection container NIO. In this way, only good parts make their way to the following ejection stations. The directly following ejection station 470-2 serves for a sporadic, more exact quality control procedure (Q, quality control). Coil springs are ejected at comparatively small or large intervals, according to a predefined checking profile, for a more exact quality control procedure. The coil springs then land in the collection container Q. The following ejection station 470-3 serves for ejecting those coil springs (good parts, IO) which are provided for further machining or further processing, thus for the further production process. The springs make their way to the downstream plant 500. Finally, there is also an empty checking station 480 where it is checked whether the spring receptacle which as the next is cycled onwards again to the loading station 430 is empty as expected, or by virtue of a malfunction still contains a coil spring (or other material) which would interfere with any loading in the downstream loading station 430.

This configuration is illustrated only by way of example. More or fewer than four cooling units can also be present in the cooling station. Optical measuring of the length instead of a tactile length measurement can also be provided at the measuring station. Alternatively or additionally, other geometric parameters of a spring, for example, the diameter thereof, or the diameter profile or the like, can also be detected in a measuring station. A measuring station for measuring the spring force can also be provided.

In the system 100, pneumatic conveying of coil springs between individual machines or stations is provided. To this end, the pneumatic conveyor system 300 has, inter alia, a pipeline 310 provided for transporting the coil springs F, which have been produced by the spring coiling machine 200 and severed from the supplied wire, successively in the cycle of the production to the loading station 430 of the downstream machine 400. Provided to this end is, inter alia, a pipeline 310 having a plastic hose which is several meters in length and forms the pipeline main piece 311. The transport of good parts to be further processed, from the ejection station 470-3 to the downstream plant 500, is likewise pneumatically implemented by way of a further pipeline 315. Bad parts are transported from the ejection station 470-3 by way of a pipeline into a collection container NIO. A further pipeline leads to the unit Q for the quality control procedures that have to be sporadically carried out. Should material still be situated in the spring receptacle at the empty station 430 for empty checking, this material is directed to a corresponding container L by way of a pipeline.

For the springs to be ejected at the corresponding workstation, pipelines in which each open out above the corresponding workstations by way of a downward-directed introduction opening are used. A star-shaped blower nozzle 428 (see detail in FIG. 5), having a multiplicity of radial slots, is incorporated in the support ring or supporting ring 426 at each workstation so that springs of the similar diameters can be supported thereon and by a compressed air pulse emanating from below can be blown away upwards into the assigned pipeline.

Further details of the pneumatic conveyor system 300 will now be explained additionally by FIGS. 4 to 7. These figures each show components of a brake installation.

Disposed on the end of the pipeline 310 that faces the spring coiling machine 200 is the spring suction installation or spring suctioning installation 320 which is operated with compressed air from a compressed air source 322 and during operation suctions the respective completed and severed spring F into the conveyor system at the entry side. The construction can be identical or similar to that of the suction installation of DE 24 17 685 A1 mentioned at the outset. The inlet opening of the spring suction installation 320 is simultaneously the inlet opening, or entry opening, respectively, of the pipeline 310 and is disposed so close to the forming tools that the front end of the developing coil spring is already situated in the suction duct of the spring suction installation before the spring is severed from the supplied wire. The severed spring is then accelerated in the transport direction of the pipeline by the compressed air flow, and in the pipeline moves in the direction of the downstream machine 400. To guarantee a camera-based feedback-control of the winding process during the spring adjustment despite the suction installation, the body of the spring suction nozzle 320 has a window 324 through which the developing spring can be observed by the camera 260.

The pipeline 310 can be several meters in length. The pipeline main piece 311, which adjoins the spring suction installation 320 at the entry side, in the example is composed of a plastic hose from polytetrafluoroethylene (PTFE) with a very smooth internal side of the pipe, which ensures that the frictional forces between the internal wall of the pipe and the spring remain low on the vast majority of the transport path. The internal diameter of the pipeline is slightly larger than the maximum external diameter of the coil spring, wherein there is sufficient radial clearance for an ideally low-friction transport, and potential curved portions of the pipe can also be passed through without compromising the transport capability.

Components of a collision-proof spring transfer system 305 are disposed at the opposite end of the pipeline 310, thus in the region of the loading station 430, directly prior to entering the spring receptacle 420. The spring transfer system 305 is constructed such that a continuous, or uninterrupted, respectively, transfer of coil springs from the pipeline 310 through an exit opening 375 of the pipeline into assigned spring receptacles 420 can take place. Additionally, the construction of the components automatically ensures that springs which have passed through the exit opening 375 in the direction of the spring receptacle and from the latter potentially want to rebound back into the pipeline are prevented from doing so in that the return path through the exit opening is blocked.

Figures 4, 5:
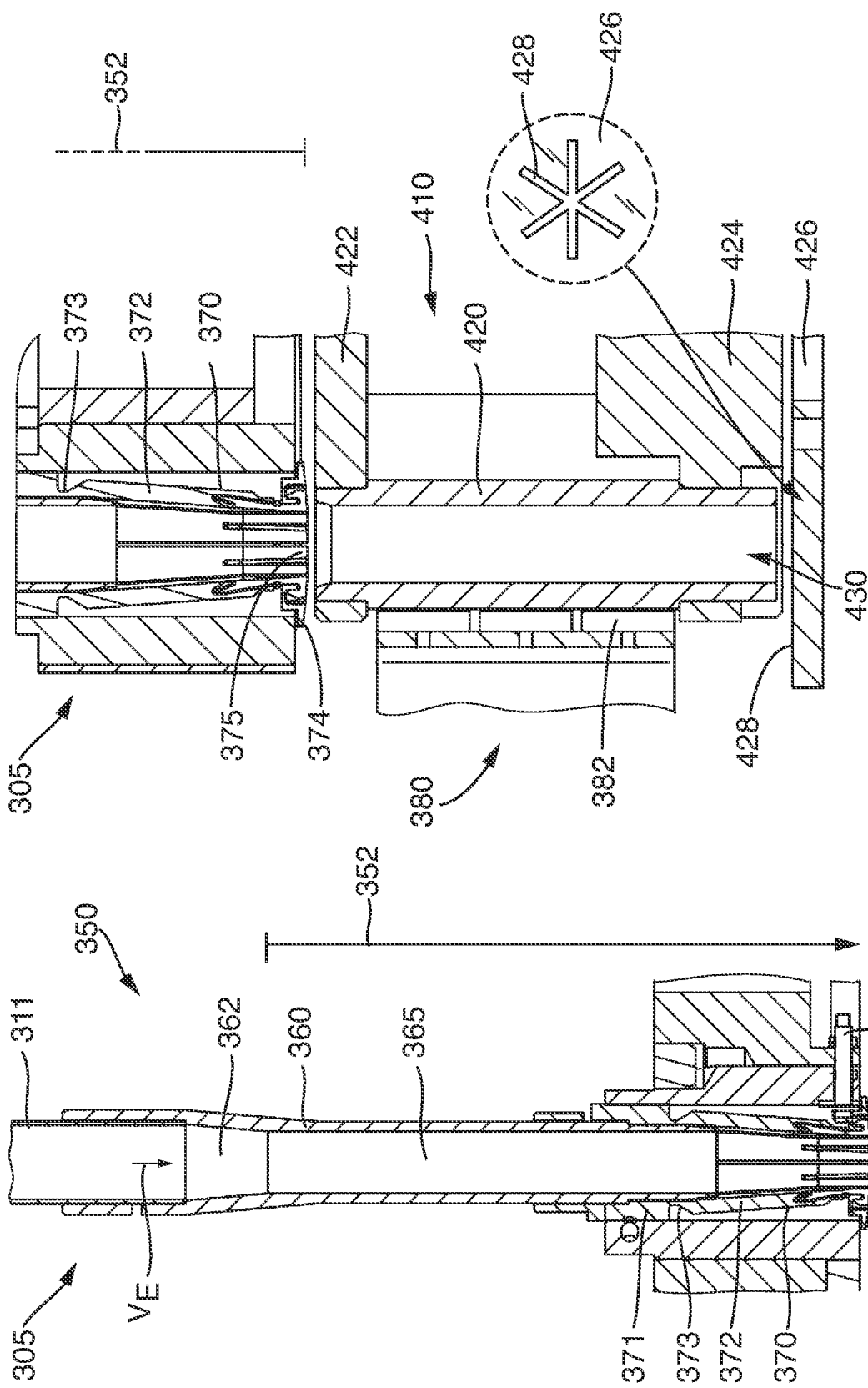
FIG. 4 shows a section through a dual-stage brake installation having a guide sleeve and a downstream, automatically closing supply nozzle.
FIG. 5 shows the transition region between the brake installation and a spring receptacle of the downstream machine, wherein a magnetic brake unit is disposed next to the spring receptacle.

A part of the spring transfer system is a brake installation 350 disposed on the end of the pipeline and thereon defines a braking track 352 for decelerating the incoming coil springs so intensely that the coil springs can be moved vertically upwards at a finite but not excessive speed into the spring receptacle that is ready in the loading position (cf. FIGS. 4 and 5). The braking track is a portion of the pipeline. The coil springs offered up by the pipeline, when entering the braking track, have an entry speed $v_E$. The exit speed $v_A$ of the coil springs when exiting the braking track is significantly reduced in comparison to the entry speed (i.e., $v_A < v_E$). The springs are not brought to a standstill but remain in motion until "arriving" in the spring receptacle. The exit speed can be just only 5% to 50% of the entry speed, for example.

The brake installation 350 is arranged such that the coil springs successively delivered at a mutual spacing can be dispensed, without mutual contact, in the cycle of entry and at the exit speed, through an exit opening in the direction of the spring receptacle situated in the loading position. It can be achieved as a result that the kinetic energy of the coil springs towards the end of the deceleration phase is still sufficient to reliably exit the brake installation in the direction of the spring receptacle. On the other hand, the exit speed is however so minor that a coil compression spring that has dropped into a spring receptacle, upon impacting the surface 428, does not rebound so intensely that a disruption of the loading procedure, which takes place in very rapid cycles, could arise.

Additionally provided is an automatically operating blocking installation (component with a variable-diameter exit opening 375) which automatically prevents that coil springs after exiting the pipeline make their way from the outlet side back into the pipeline, for example, by virtue of rebounding from the base of the spring receptacle.

An example of the brake installation which operates in a particularly reliable manner will now be explained in more detail by FIGS. 4 to 7. The brake installation 350 at the entry side has a spring guide sleeve 360 which on the entry side thereof has an internal diameter which corresponds approximately to the external diameter of the pipeline main piece 311, and for producing an air-tight connection can thus be pushed onto the latter and fastened thereto. This widened portion is adjoined by a funnel portion 362 which tapers conically toward the bottom and transitions to a cylindrical guide duct 365, of which the internal diameter is only a few tenths of a millimeter larger than the largest external diameter of the coil springs to be guided. The spring guide sleeve 360 is a replacement part which is adapted to the workpiece. The axial length of the guide duct 365 is multiple times larger than the internal diameter thereof such that a relatively long first braking track portion is formed in which the coil spring is pacified and by virtue of dynamic friction on the internal walls, above all of the cylindrical guide portion, is already decelerated from the entry speed to a lower speed.

Adjoining toward the bottom, thus in the direction of the spring receptacle, is an automatically closing supply nozzle 370 which is shown in the longitudinal section in FIGS. 4 and 5 and in an isometric view in FIG. 6. The supply nozzle, which can also be referred to as an exit nozzle, is attached to the lower end of the guide sleeve and fastened thereon such that a connection which is preferably airtight in the radial direction is created. The supply nozzle 370 has an entry-proximal sleeve-shaped base portion 371 which at the lower end of the guide sleeve is fastened to the lower end of the spring guide sleeve by being plugged onto the latter. The base portion on the exit side has an annular arrangement of, for example, six elastically movable fingers 372 of identical design, which on the exit side of the supply nozzle conjointly enclose a substantially annular exit opening 375 which is simultaneously the exit opening of the pipeline 310 of the pneumatic conveyor system 310. Cover portions 374 in the shape of ring segments protrude radially outward on the ends of the fingers. An exit sensor 379 in the form of a proximity switch, which emits a signal when a spring has passed the exit opening, can be seen directly in front of the exit opening in FIG. 4. The signals can be utilized for feedback-controlling the acceleration of the spring by the optimal spring speed. When using the exit sensor 379 to detect a coil spring exiting the exit opening, the operating control system knows at any time when a coil spring exits the conveyor system in the direction of the spring receptacle, and how many springs exit in absolute terms and per time unit.

The exit opening 375 is variable in terms of the diameter. The exit opening 375 functions as part of the brake installation 350, on the one hand, and on the other hand as a blocking installation 375 which protects the pipeline in relation to rebounding springs.

In the system 100, the internal transport unit 410 of the downstream machine 400 is controlled in such a manner as a function of sensor signals of the exit sensor that the internal transport unit is briefly shut down when an exiting coil spring is detected. Undesirable collision situations, which could lead to the deformation of coil springs and/or to damage to the installations of the machine, can be avoided as a result.

The free end portions of the fingers 372 conjointly form a variable-diameter portion of the supply nozzle. In the unstressed basic state, thus when no coil spring is passing through, the internal diameter $d_I$ of the exit opening 375 is a few percentage points (for example, between 5% and 20%) smaller than the (maximum) external diameter of the conveyed coil springs. However, the exit opening can be elastically widened to a larger passage cross section by a coil spring passing through. The elastic resilience of the free end portions of the fingers in the radial direction in this construction is substantially achieved in that a spring-elastic integral hinge portion 373 is each formed between the base portion 371 and the relatively torsion-resistant portions of the fingers 372, the integral hinge portion 373 making it possible that the fingers pivot outwards in the radial direction and in the absence of any load assume the inner basic position thereof.

The supply nozzle 370 in the example is an integral component which by 3D-printing is produced from a thermoplastic synthetic material. The production by 3D-printings permits the elastic characteristics of the fingers to be rapidly and most accurately adapted to the geometric and kinetic characteristics of the spring to be conveyed.

The passage duct that leads through the supply nozzle on the entry side has approximately the internal diameter of the cylindrical supply duct 365 of the upstream spring guide sleeve. The diameter thereafter decreases steadily in the direction of the exit opening 375 such that a spring moving in the direction of the exit opening 375 is faced with an increasingly higher resistance to movement, the latter resulting in that the static friction between the internal sides of the elastic fingers and the external side of the spring increases the more the spring approaches the exit opening. To guarantee a long service life of the frictionally-loaded parts of the supply nozzle despite the use of a plastics material, flat anti-wear elements 376 from hardened steel are each recessed in the region of the end portions of the elastic fingers 372, the anti-wear elements 376 on the internal sides of the end portions of the fingers each forming wear-resistant guide faces 377 that run in the axial direction. The anti-wear elements in the inward direction protrude somewhat beyond the internal side of the finger ends such that the finger ends do not come into direct frictional contact with the coil spring.

The brake installation 350 is a passive functional unit, thus performs its function without dedicated drives. A deceleration of the incoming coil springs in two stages is guaranteed with the aid of the brake installation 350. It is mainly a pacification that takes place in the relatively long cylindrical guide duct 365 of the guide sleeve, and a deceleration as a result of friction takes place only to a limited extent. The majority of the braking effect is caused by the automatically closing exit nozzle 370.

Because the diameter of the exit opening 375 after the passage of the coil spring and after the bouncing back of the elastic fingers is smaller than the external diameter of the spring that has passed through, potential rebounding of the spring that has been permitted through back into the supply duct is simultaneously blocked by the supply nozzle 370, or exit nozzle 370, respectively. The exit nozzle, or the exit opening, respectively, thus functions also as a blocking installation which by purely mechanical means prevents the re-entry of the spring after the latter has exited the exit nozzle. This is a substantial contribution towards a trouble-free operation of the manufacturing system, even at high cycle rates.

Further elements which have a braking effect can be provided. The sectional illustration in FIG. 5 shows an example in which a magnetic brake unit 380 having at least one magnet 382 is part of the brake installation. The components of the magnetic brake unit on the downstream machine 400 are assembled on the loading station 430 of the latter such that the magnets are situated in direct proximity of the external side of the spring receptacle 430 when the latter is situated in the loading position. As a result, a coil spring introduced into the spring receptacle can be decelerated with the aid of magnetic forces and held in the spring receptacle. A single bake magnet may suffice, depending on the type of the spring. In the example, three permanent magnets which are disposed on top of one another are provided such that the effective length of the magnetic brake unit 380 corresponds to more than half the length of the spring receptacle 430 between the axial ends of the latter.

As a result of the retaining function of the magnets, the coil springs by using magnetic force are prevented from moving across comparatively large distances back in the direction of the exit opening such that the re-entry of springs from the exit side into the pipeline can be prevented to this extent.

The magnetic brake unit not only has a braking effect and a retaining effect on materials which are all originally magnetizable such as many spring wires, for example. The magnetic brake unit can in fact also be used effectively when processing coil springs from stainless steel, for example, thus in springs made from austenitic corrosion-resistant steel. As is known, this material has a very low magnetization capability and is practically non-magnetic in the production state. However, we established that the material becomes magnetizable when cold-formed by spring coiling. When using a magnetic brake unit, this can be utilized advantageously in the context of reliable deceleration and securing in relation to jumping out of the spring receptacle.

The automatically closing supply nozzle 370 described above is a passive construction element, the functions of the latter (deceleration by friction, blocking in relation to re-entry of a rebounding coil spring) in part being activated by the coil springs passing through per se. There are also examples of supply nozzles having a positive control, thus of externally switchable variants. To this end, FIG. 7 shows an example of a supply nozzle 390 which can be pneumatically externally actuated to immediately reduce the passage cross section as soon as a coil spring has completely exited the nozzle in the direction of the spring receptacle. Formed to this end in the nozzle mounting 398 is an annular duct 396 which by way of an air connector 397 can be connected to a compressed air source. In a manner similar to the example of FIG. 6, the supply nozzle has a sleeve-shaped closed base portion, and attached thereto elastic fingers or fins 392, respectively, the free ends of the latter enclosing the exit opening 395. In the absence of external forces, this exit opening 395 has a passage cross section which is slightly larger than the maximum external diameter of the coil spring such that the latter fits through without displacing the fingers toward the outside. At best, a minor or no braking effect is generated in this way. In the externally switchable example, the transport speed of the springs can be lower than in the self-closing exit nozzle described above because the springs do not have to "push" their own way through the nozzle.

An elastic sleeve 391 encloses the portions below the base portion, including the integral hinges and the fins or fingers, respectively, following therebelow. The supply sleeve in the non-stressed state is open so wide that the spring can fly through. Once the spring has flown through, the elastic sleeve 391 is impinged with compressed air. The pressure in the annular gap 396 has the effect that the elastic sleeve 391 is radially compressed. As a result, the fingers 392 of the nozzle are compressed to the extent that a rebounding spring can no longer enter the nozzle through the exit opening 395. The air pressure is switched off for the next cycle such that the elastic sleeve and the fingers of the nozzle can assume their original shape again.

The system 100 (manufacturing system 100) is equipped with an operating control system comprising a multiplicity of sensors to monitor the production and feedback-controlling production parameters as a function of sensor signals. Some of the sensors in the example are: a spring passage sensor S1 in the initial region of the pipeline 310 in the proximity of the spring coiling machine 200; a spring passage sensor S2-1 in the end region of the pipeline 310 ahead of the beginning of the braking track. A further spring passage sensor S2-2 in the proximity of the sensor S2-1, likewise ahead of the entry to the brake installation 350. Sensors S3, S4 and S5 on the pipeline 315 which leads from the ejection station 470-3 for good parts to the downstream plant 500. A sensor S6 which detects the ejection of bad parts of a corresponding ejection station 470-1. A sensor S7 which checks the ejection of coil springs that are to be directed to quality control (Q). A sensor S8 for counting potential coil springs which are ejected only at empty checking.

Furthermore provided are a plurality of nozzles by way of which compressed air can be fed into the pipelines at various locations. A nozzle D1 is provided in the region of the spring suction device 320; the nozzle D1 causes the original acceleration of the severed coil springs F into the pipeline 310. Because the pipeline can be relatively long, one or a plurality of intermediate acceleration nozzles can be expedient between the spring machine and the exit opening 375 on the downstream machine 400; an intermediate nozzle D2 is schematically illustrated. An intermediate acceleration nozzle D3 (or a plurality of intermediate acceleration nozzles) can be provided also in the further pipeline 315 which is disposed downstream of the downstream machine 400.

During operation, the sensor signals of the sensors S1 and S2-1 at the beginning and at the end of the pipeline 310 are utilized for monitoring the time-of-flight. If the latter is outside a permissible time-of-flight range, or if the latter will predictably develop from a still acceptable range to a critical range, for example, after a comparatively long operation by virtue of increasing contamination in the interior of the pipe, the volumetric flow of the compressed air in the suction installation 320 at the suction nozzle D1 can be increased to ensure a time-of-flight in the specified range, for example.

The sensors S3, S4, and S5 in the further pipeline can be utilized to monitor the time-of-flight. The signals can be processed in an analogous manner for controlling the intermediate nozzle D3 to ensure that the conveyed coil springs arrive at the downstream plant 500 in the desired cycle of production of the coil springs.

The entry speed of the coil springs when entering the directly following brake installation 350 can be determined with the aid of the sensors S2.1 and S2.2 which lie close to one another. In the example a proportional valve, which controls the supply of compressed air at the intermediate nozzle D2, is activated as a response to target value variances outside the specified range.

Monitoring of the whereabouts of 100% of the springs can be carried out with the aid of the sensors S6, S7 and S8 when interacting with S5.

The invention claimed is:

1. A method of producing coil springs from wire comprising:
    conveying wire from a wire reserve to a numerically controlled spring coiling machine;
    successively forming portions of the wire in the spring coiling machine to coil springs in a forming operation;
    severing each coil spring after the forming operation from the supplied wire; and
    successively transporting severed coil springs through a pipeline of a pneumatic conveyor system into a spring receptacle of a downstream machine,
    wherein the successively transporting comprises a collision-proof spring transfer comprising continuously transferring coil springs from the pipeline through an exit opening of the pipeline into assigned spring receptacles, and automatically preventing re-entry of coil springs that have passed through the exit opening in the direction of the spring receptacle and rebound from the region of the spring receptacle back into the pipeline.

2. The method according to claim 1, wherein the collision-proof spring transfer comprises at least one of:
    (i) decelerating the successively transported coil springs in the region of a brake installation disposed on the end of the pipeline over a braking track, from an entry speed when entering the braking rack to a finite exit speed, reduced compared to the entry speed, when exiting the braking track such that the coil springs are dispensed at the exit speed, without mutual contact and in the cycle of entry, through an exit opening in the direction of the spring receptacle, and
    (ii) automatically preventing re-entry by blocking the pipeline in relation to any re-entry of a coil spring rebounding in the region of the spring receptacle upon passing through the exit opening.

3. The method according to claim 2, wherein the coil springs during deceleration are decelerated in a plurality of successive braking stages with different braking effects, one braking stage comprises a frictional braking stage in a guide duct adapted in terms of diameter, and a subsequent braking stage comprises squeezing through an elastically expandable exit opening with a diameter deficit, and/or wherein in one braking stage a coil spring introduced into a spring receptacle is decelerated by magnetic forces and is held in the spring receptacle.

4. The method according to claim 2, further comprising feedback-controlling the entry speed to a value within a specification range by detecting an actual speed of the coil springs in the region of a measuring section between the spring coiling machine and the brake installation; comparing the actual speed with a target speed for determining a speed variance; and varying a conveying output in the pipeline as a function of the speed variance.

5. The method according to claim 1, wherein the automatically preventing re-entry of coil springs comprises temporarily varying the diameter of the exit opening between a first diameter, which is smaller than the maximum diameter of the coil spring, and a second diameter, which permits the coil spring to pass through the exit opening.

6. The method according to claim 1, wherein the downstream machine has a plurality of workstations and an internal transport unit having a multiplicity of spring receptacles for transporting coil springs to the workstations, wherein controlling of the transport unit as a function of the infeed of coil springs is provided.

7. A system that produces coil springs from wire comprising:
- a spring coiling machine having a infeed device for conveying a wire to a forming installation which has forming tools for forming the wire to a coil spring, and having a cutting installation for severing a coil spring from the supplied wire after completion of a forming operation;
- a pneumatic conveyor system having a pipeline successively transporting severed coil springs from the spring coiling machine to the downstream machine,
- wherein a feeding installation for pressurized fluid to accelerate the coil springs in the transport direction is disposed behind an inlet opening of the pipeline, and an exit opening dispenses the coil springs into assigned spring receptacles is disposed on an exit side of the pipeline, and
- a collision-proof spring transfer system configured for a continuous transfer of coil springs from the pipeline through an exit opening of the pipeline into assigned spring receptacles, and automatically preventing any re-entry of coil springs that have passed through the exit opening in the direction of the spring receptacle and rebound from the region of the spring receptacle back into the pipeline.

8. The system according to claim 7, wherein the spring transfer system has at least one of:
   (i) a brake installation which at the end of the pipeline defines a braking track and is configured to decelerate successively incoming coil springs within the braking track from an entry speed when entering the braking track to a finite exit speed, reduced in comparison to the entry speed, when exiting the braking track such that the coil springs are dispensed at the exit speed, without mutual contact and in the cycle of entry, through an exit opening in the direction of the spring receptacle; and
   (ii) a blocking installation for automatically blocking the pipeline in relation to any re-entry of a coil spring rebounding from the region of the spring receptacle after passing though the exit opening.

9. The system according to claim 8, wherein the brake installation has an automatically closing supply nozzle which has a nozzle body with a variable-diameter portion that has an internal diameter which in a load-free basic state is smaller than the external diameter of the coil spring and by way of a coil spring passing through is able to be elastically expanded to a passage cross section, wherein the variable-diameter portion preferably forms the exit opening.

10. The system according to claim 9, wherein the supply nozzle has an entry-proximal sleeve-shaped base portion and an annular assembly having a plurality of fingers which by way of spring-elastic integral hinge portions are connected to the base portion in a radially pivotable manner, wherein free ends of the fingers enclose the exit opening.

11. The system according to claim 9, wherein the supply nozzle is made of plastics material by 3D-printing, and anti-wear inserts from a wear-resistant material or hardened steel are inserted on the free ends of the fingers.

12. The system according to claim 8, wherein the brake installation has a spring-specifically adapted spring guide sleeve having a cylindrical guide duct which has an internal diameter that is adapted to the external diameter of the coil springs such that the coil springs fit through the guide duct substantially without any clearance, wherein the spring guide sleeve, on an entry side of the guide duct, has an introduction portion which conically widens towards the entry side and transitions to a cylindrical attachment portion of which the internal diameter corresponds substantially to the external diameter of an upstream portion of the pipeline.

13. The system according to claim 12, wherein the spring guide sleeve is disposed between a pipeline main piece and a supply nozzle.

14. The system according to claim 8, wherein the blocking installation has at least one locking element which in response to control signals and with the aid of a drive is able to be transferred automatically from a retracted neutral position, or neutral configuration, to a blocking position, or blocking configuration to block the return path.

15. The system according to claim 7, wherein the exit opening of the spring transfer system is configured as a variable-diameter exit opening which permits a temporary variation of the diameter of the exit opening between a first diameter and a second diameter, wherein the first diameter is smaller than the maximum diameter of the coil spring, and the second diameter permits the coil spring to pass through the exit opening.

16. The system according to claim 7, wherein the spring transfer system or the brake installation has a magnetic brake unit having at least one magnet assigned to a spring receptacle and is configured to decelerate by magnetic forces a coil spring introduced into the spring receptacle, and holds the coil spring in the spring receptacle.

17. The system according to claim 7, wherein the downstream machine has a plurality of workstations and an internal transport unit for transporting coil springs along a transport section to the workstations, wherein the transport unit by a rotary drive is rotatable about a rotation axis and has a multiplicity of spring receptacles disposed in the form of a ring about the rotation axis and are configured for receiving a single coil spring, wherein one of the workstations is a loading station and the pipeline leads to the loading station such that an end portion of the pipeline that contains the exit opening is disposed to be coaxial with a spring receptacle positioned in the loading position.

18. The system according to claim 17, wherein the downstream machine has a heat treatment unit which comprises a heating station disposed downstream of the loading station, and a cooling station disposed downstream of the heating station, said cooling station comprising two, three, four or more successive cooling units.

19. The system according to claim 17, wherein at least one of the workstations is additionally provided along the transport section:
- a setting station disposed downstream of the heat treatment unit;
- a measuring station disposed downstream of the heat treatment unit and/or the setting station;
- an ejection station for bad parts, which is disposed downstream of a measuring station;
- an ejection station which leads to a quality control unit and is disposed downstream of a measuring station;
- an ejection station for good parts, which is disposed downstream of a measuring station; and
- an empty checking station.

20. The system according to claim 7, further comprising an operating control system having a multiplicity of sensors for monitoring the production and for feedback-controlling production parameters as a function of sensor signals, wherein the operating control system comprises one or a plurality of the functional groups:
- two spring passage sensors which are disposed to be mutually spaced apart at different positions of the pipeline, wherein sensor signals of the spring passage sensors are processed for detecting the time-of-flight and/or for determining the entry speed of the coil springs into a braking track, wherein a conveying output of the conveyor system is feedback-controlled as a function of the entry speed;
- an exit sensor for detecting a coil spring exiting the exit opening, wherein preferably an internal transport unit of the downstream machine is able to be controlled as a function of sensor signals of the exit sensor such that the internal transport unit is stopped while a coil spring is exiting;
- a good parts sensor for detecting the number of ejected good parts;
- a bad parts sensor for detecting the number of ejected bad parts;
- a quality control sensor for detecting the number of coil springs ejected for quality control; and
- an empty checking sensor.

* * * * *